United States Patent [19]
Catena et al.

[11] Patent Number: 5,814,701
[45] Date of Patent: Sep. 29, 1998

[54] PROCESS FOR THE PRODUCTION OF WATER SOLUBLE MODIFIED ROSIN ESTER VEHICLES FOR LAMINATING INKS

[76] Inventors: Robert J. Catena, 78 Plenge Dr., Belleville, N.J. 07109; Mathew C. Mathew, 24 Bryant Ave., Bloomfield, N.J. 07003; Albert A. Kveglis, 7 Buckingham Cir., Pine Brook, N.J. 07058

[21] Appl. No.: 536,014

[22] Filed: Sep. 29, 1995

Related U.S. Application Data

[63] Continuation-in-part of Ser. No. 190,624, Feb. 2, 1994, abandoned.

[51] Int. Cl.$^6$ ..................................................... C08G 63/48
[52] U.S. Cl. .................. 525/54.44; 524/272; 525/54.45; 525/329.7; 525/330.1
[58] Field of Search ......................... 524/272; 525/54.44, 525/54.45, 329.7, 330.1

[56] References Cited

U.S. PATENT DOCUMENTS 5,026,755  6/1991  Kveglis et al. ........................ 524/389
5,164,446  11/1992  Boswell et al. ...................... 525/54.44
5,183,847  2/1993  El-Hefnawi et al. ................ 525/54.44
5,189,090  2/1993  Hutter et al. ............................ 524/272
5,216,064  6/1993  Rivera et al. ........................... 524/457

*Primary Examiner*—Judy M. Reddick

[57] ABSTRACT

A method for the production of an improved water soluble resin binder for laminating printing inks has been discovered. The method comprises esterifying the carboxylated Diels Alder adduct produced from the reaction of rosin and at least one carboxylated dienophile with a sufficient amount of at least one polyol to produce a modified rosin having an acid number greater than 157. The modified rosin is reacted with a sufficient amount of an acrylic copolymer having an acid number greater than 180 under esterification conditions between 175° C. and 185° C. for a time sufficient to produce a resin binder having an acid number greater than 157. A laminating ink formulation of the invention comprises water, pigment, styrene-acrylic varnish, shellac varnish, alkanol and the improved water soluble resin binder of the invention as described above.

4 Claims, No Drawings

PROCESS FOR THE PRODUCTION OF WATER SOLUBLE MODIFIED ROSIN ESTER VEHICLES FOR LAMINATING INKS

RELATION TO OTHER PATENT APPLICATIONS

This application is a continuation-in-part of U.S. patent application Ser. No. 08/190,624 filed Feb. 2, 1994, now abandoned.

FIELD OF THE INVENTION

This invention relates to a method for preparing superior water-based resin binders useful in the formulation of laminating inks. The present invention particularly relates to a novel method for the production of styrenated acrylic modified rosin ester resins useful in laminating printing inks. The method of the invention provides rosin ester resins that are water soluble and suitable for flexible packaging ink formulation while conferring important improvements in the properties of those printing inks.

BACKGROUND OF THE INVENTION

The formulation of printing inks is dominated by the application for which the ink is to be used. Inks for gravure printing of paper or paperboard present a comparatively mild challenge to the artisan to formulate an appropriate ink but other applications can escalate that challenge beyond the scope of the state of the art. The required presentation of the printed article, the composition of the substrate on which the ink is to be printed and the post-printing process and use to which the article is to be exposed readily conspire to complicate the formulation process, often creating a need to formulate well beyond the state of the art. Metallized substrates, food packages and the packing process, laminates and the laminating process are just a few examples of specific end-uses or post-printing processes offering continuing challenges to the ink formulation artisan.

Known ink formulations are confronted constantly with the test to meet the needs of an ever changing mix of consumer products with ever changing print demands. Now, a fundamentally new constraint is being imposed upon many ink formulations by environmental regulations that urge a reduction in the use of organic solvents in ink formulations. For the more exacting applications such as inks suitable for laminates and the lamination process, the need to produce water based ink formulations which meet or preferably exceed the performance of formulations of laminating inks known in the art represents a prodigious challenge to the artisan. To this challenge, the present applicants have bent their efforts and provided the instant invention of a water based laminating ink formulation with performance properties that exceed those of the prior art.

Inks for lamination comprise a wide range of formulations depending upon the type of lamination process—adhesive, extrusion lamination or extrusion coating—the many substrates used, adhesive type and end-use of the laminate. In the foregoing laminates the printing ink is within the interface of the two substrates and the performance of the ink formulation must take into account and be compatible with the stresses of the lamination process. Key ink requirements are bond strength to the substrate and compatibility with the adhesive. Acrylic-based resins, among others, have been found to be useful as binders in meeting the formulation requirements of laminating inks. The physical mixture of styrenated acrylics and rosin esters as binders in flexible packaging inks is known to be particularly useful, but with limitations. They usually impart gloss and heat resistance to systems formulated with them. However, problems such as crinkle resistance, alcohol tolerance, bond strength and rheology can arise with their use.

U.S. Pat. No. 5,164,262 to Boswell, et al. discloses a method for the production of an acrylic polymer modified rosin ester binder for gravure printing ink formulations for paper. The binder is soluble in organic solvents such as toluene. U.S. Pat. No. 5,166,446 also to Boswell, et al. claims the acrylic polymer modified rosin ester. The Boswell, et al. patent is described hereinafter in greater detail with respect to the pertinency to the instant invention U.S. Pat. No. 5,026,755 to Kveglis, et al. teaches a water-dispersable graft copolymer of a polyamide and an acrylic monomer produced by free radical polymerization.

U.S. Pat. No. 5,183,847 to El-Hefnawi, et al. discloses alkali soluble resins of carboxylated polyamide/acrylic resin prepared by a fusion process.

U.S. Pat. No. 5,216,064 to Rivera, et al. teaches rosin-based resin-fortified emulsion polymer compositions and the method for their preparation. The emulsions are prepared by polymerization of vinyl monomers and are used to prepare water based inks.

It is an objective of the present invention to provide a method for the production of a water soluble modified rosin-acrylic vehicle for laminating ink formulation.

Another objective of the invention is to provide a laminating ink exhibiting superior properties and containing the water soluble modified rosin-acrylic vehicle.

SUMMARY OF THE INVENTION

Through the application of the discoveries of the present invention novel water based laminating inks have been formulated that exhibit uniquely superior properties in crinkle resistance, bond strength and alcohol resistance. These achievements have been realized by employing as a vehicle for the laminating inks esterified carboxylated Diels Alder adducts of rosins plus acrylic copolymers. It has been discovered that when these components are reacted under the conditions of the invention a product of higher molecular weight is produced having a high acid number. The product can be used as a vehicle for water based laminating inks to overcome problems common to the use of conventional laminating ink formulations.

More particularly, a method for the production of an improved water soluble resin binder for laminating printing inks has been discovered. The method comprises esterifying the carboxylated Diels Alder adduct produced from the reaction of rosin and at least one carboxylated dienophile with a sufficient amount of at least one polyol to produce a modified rosin having an acid number greater than 156. The modified rosin is reacted with a sufficient amount of an acrylic copolymer having an acid number greater than 180 under esterification conditions between 175° C. and 185° C. for a time from fifteen minutes to forty five minutes to produce a resin binder having an acid number between 157 and 175.

The invention includes a method for the production of an improved aqueous varnish solution for laminating printing ink comprising esterifying fumarated gum rosin with a sufficient amount of pentaerythritol to produce a modified rosin having an acid number of 157–175. At a weight ratio of 1 to 1, the modified rosin is reacted with styrenated acrylic copolymer having an acid number of about 202 under esterification conditions at about 180° C. for about 1 hour whereby a resin is produced having an acid value of 160–173, melting point of 155°–165° C. and molecular weight of about 14,400. The resin is dissolved in dilute ammonium hydroxide to provide an aqueous varnish solution having a pH of 8.5 and viscosity of 0.5–2.0 poises.

A laminating ink formulation of the invention comprises water, pigment, styrene-acrylic varnish, shellac varnish, alkanol and the improved water soluble resin binder of the invention as described above.

DETAILED DESCRIPTION OF THE INVENTION

The use of acrylic copolymers and modified rosin esters as resin binders in flexible packaging inks has been known for some time. These materials are the precursors employed in the novel process of the present invention to produce the modified resin product whose unique properties are responsible for the improved laminating ink formulations described herein.

The rosins used in the present invention include tall oil rosin, gum rosin and wood rosin. However, gum rosin is the preferred rosin. The selected rosin is converted to a carboxylated Diels Alder adduct by reaction with a carboxy Diels Alder dienophile under conditions well known in the art, preferably between the melting point of the rosin and the boiling point of the dienophile. The preferred carboxy dienophiles for reaction with the rosin component are fumaric acid, maleic acid, acrylic acid, methacrylic acid, itaconic acid, citraconic acid and maleic anhydride.

Upon completion of the Diels Alder reaction, the carboxylated rosin adduct is reacted with a polyfunctional alcohol or polyol and an acrylic copolymer to form a modified rosin ester resin. The polyols or polyhydric alkanols useful in the invention include pentaerythritol, trimethylolpropane, trimethylolethane, glycerine and the like. The reaction between rosin adduct and polyol is carried out under esterification conditions, preferably employing basic catalysis. The ratio of esterification reactants and reaction conditions are selected to produce a polyol esterified adduct having an acid number between 150 and 170, but preferably between 157 and 161.

The novel modified resin of the invention is produced by reacting the esterified rosin adduct with an acrylic copolymer. Typical acrylic copolymers include those prepared from acrylic monomers such as acrylic acid, and methacrylic acid plus vinyl monomers such as styrene, alpha methyl styrene, vinyl acetate or mixtures thereof. A preferred copolymer is Joncryl 679®, available from S. C. Johnson, which has an acid number of 202 and molecular weight of 9,900. The reaction is carried out to produce a new water soluble higher molecular weight product, i.e., the modified resin product, with an acid number between 157 and 175, but preferably between 160 and 173.

A key feature of the process of the present invention is the production of a modified resin having an acid number high enough to confer water solubility on the product resin and yet advance the ink properties prepared from the resin, as described hereinafter. A wide range of variables can affect the realization of this objective including the ratio of esterified rosin adduct to acrylic copolymer in the reaction, the acid number of the adduct and copolymer, reaction time and reaction temperature. It has been discovered that a superior resin having an acid number between 160 and 173 is produced by reacting the modified rosin and acrylic copolymer at a weight ratio between 1:2 and 1.5:1 when the copolymer has an acid number of about 180–220, preferably about 202, under esterification conditions at about 175° C. to 185° C. for 15 to 45 minutes.

The following example (Example 1) describes a preferred embodiment of the present invention leading to the production of a modified rosin ester resin that can be used as a vehicle for the preparation of laminating printing inks with superior bond strength and crinkle resistance. Unless specified otherwise, the term parts in the following examples refers to parts by weight.

EXAMPLE 1

Resin Synthesis 100 parts of a pentaerythritol ester of a fumarated gum rosin with an acid number of 157–161 and melting point of 117°–119° C. (manufacturer: Ascona, resin name: FP130) was charged into a 4 neck 1 liter round bottom flask equipped with a nitrogen blanket, thermometer, mechanical agitator, and reflux condenser. The contents, when melted, were agitated moderately. The temperature was increased and held at 180° C. At this time 100 parts of a styrenated-acrylic copolymer (S. C. Johnson, Joncryl 679 with acid number of 202 and melting point of 146° C.) was added over a ten minute period. Temperature was maintained at 180° C. for one hour and the product was discharged. The resin product had an acid value of 160–173; a melting point of 155°–165° C.; viscosity of 1–4 poises in 50% ethanol and a weight average molecular weight of 14,400. Gel permeation chromatographic analysis of the resin showed that a new higher molecular weight product was formed by the fusion of the two resins and that the material was not a simple blend of the two starting resins. It was observed that the temperature of the reaction and hold time were extremely critical. At temperatures above 210° C. the resin was unstable and a gel formed quickly.

Example 2 describes the method for the preparation of a water based varnish using the product from the reaction of Example 1.

EXAMPLE 2

Varnish Preparation

To a 4-neck 1 liter round bottom flask equipped with a nitrogen blanket, thermometer, mechanical agitator, and reflux condenser was charged 275.8 parts deionized water and 16 parts ammonium hydroxide. With good agitation, 108.0 parts of Example 1 was added slowly. The temperature of the system was increased and held at 90° C. Upon total solubilization of the resin the solution was cooled to 40° C. and discharged. At 27% TNV, and pH of 8.5 the solution viscosity is 0.5–2.0 poises.

A series of experiments, depicted here as Examples 3–8, was carried out to compare the performance of different basic ink formulations containing the varnish of Example 2 with a typical basic ink formulation replacing the varnish of Example 2 with a fumarated rosin.

EXAMPLE 3

Basic Ink Formulations

A. Grinding Portion

| Ink Formulation | Parts |
| --- | --- |
| 1. Styrene-Acrylic Varnish (50% (wt.) in ammonia/water) | 24.20 |
| 2. Water | 40.00 |
| 3. Defoamer | 0.40 |
| 4. Phthalocyanine Blue Pigment | 32.00 |
| 5. Water | 3.40 |
| | 100.00 |

The above ink was prepared in the following manner: Initially, ingredients (1–4) were placed in a horizontal mill until the colorant was properly dispersed. Then item (5) is used to wash out the mill.

B. Letdown portion

| | Parts |
| --- | --- |
| 1. Example 2 | 50.00 |
| 2. Shellac Varnish (30%) (wt.) in ammonia/water | 28.00 |
| 3. n-Propanol | 8.00 |
| 4. Defoamer | 0.50 |
| 5. Water | 3.40 |
| | 100.00 |

The above items were added to a high speed mixer and agitated until a homogeneous vehicle results. The ink was made by adding 55 parts of the grinding portion to 45 parts of the letdown portion. The vehicles were again placed in a high speed mixer for homogeneity. Inks were reduced to 12" on a number 3 Zahn cup with 80/20 (w/w) water:n-Propanol.

EXAMPLE 4

The same ink was prepared as in Example 3 with the exception of replacing the varnish of Example 2 in the letdown portion with a fumarated rosin.

The properties of the inks prepared in Examples 3 and 4 are compared in Table 1. The Table shows that the properties of the ink prepared with the resin of the invention (Example 3) has distinctly superior properties, particularly with respect to bond strength and crinkle resistance.

TABLE 1

Comparison of Ink Properties with/without New Vehicle

| Property | Example 3 | Example 4 |
| --- | --- | --- |
| Flow | Newtonian | Thixotropic |
| Alcohol Tolerance (10% n-PROH) | Fluid | Gels |
| Extrusion Bond Strength (commercial polypropylene) | 200 g/in (film tear) | 80–100 g/in (decal) |
| Print Quality | Smooth lay | Severe pinholing |
| pH Tolerance | 8.0–9.55 | 9.45–9.55 |
| Crinkle Resistance | Very Good | Fair |

The following Examples 5–6 and 7–8 compare the properties of the resin of the invention with typical formulations containing fumarated rosin resin and employing two different pigments.

EXAMPLE 5

| Grinding Portion | Parts |
| --- | --- |
| 1. Styrene-Acrylic Varnish (50% (wt.) in ammonia/water) | 25.10 |
| 2. Water | 40.00 |
| 3. Defoamer | 0.40 |
| 4. AAOT Yellow pigment | 32.00 |
| 5. Water | 2.50 |
| | 100.00 |

The above base was prepared according to the procedure set forth in Example 3. The letdown portion was identical to that of Example 3. The ink was prepared in the same manner as that described in Example 3.

EXAMPLE 6

The same ink was prepared as in Example 5 with the exception of replacing the varnish of Example 2 in the letdown portion with a fumarated rosin resin. Results were comparable to those observed in Table 1.

EXAMPLE 7

| Grinding Portion | Parts |
| --- | --- |
| 1. Styrene-Acrylic Varnish (50% (wt.) in ammonia/water) | 24.90 |
| 2. Water | 40.00 |
| 3. Defoamer | 0.40 |
| 4. Barium Red Pigment | 32.10 |
| 5. Water | 2.60 |
| | 100.00 |

The above base was prepared according to the procedure set forth in Example 3. The letdown portion was identical to that of Example 3. The ink was prepared in the same manner as that described in Example 3.

EXAMPLE 8

The same ink was prepared as in Example 7 with the exception of replacing the varnish of Example 2 in the letdown portion with a fumarated rosin resin. Results obtained were comparable to those observed in Table 1.

These experiments demonstrate the superiority of the present invention over those in the prior art. Referring to U.S. Pat. Nos. 5,164,262 and 5,166,446 to Boswell, et al., the modified rosin ester products of that invention are soluble in aromatic hydrocarbon solvents for use in gravure printing. The high reaction temperatures of those patents are not useful in the present invention as they cause the resin of the instant invention to gel. Also, the subject patents produce a product of low acid number and rely on a much smaller amount of acrylic polymer. The instant invention requires a high acid value of 150–175 for the resin of the invention to be soluble in lower alcohols or amine/water mixtures for aqueous packaging inks.

To define and illustrate the differences between the U.S. Pat. No. 5,164,446 of Boswell, et al. and the instant invention a series of experiments was carried out as described in the following examples. The product cited by H. Boswell, et al. in "Modified Rosin Esters and Their Use in Printing Inks", U.S. Pat. No. 5,164,446, was made according to the procedure outlined in Examples 1 and 2 of that patent and evaluated. First, as expected, this toluene based vehicle is not water dispersible. Inks prepared utilizing our material in a water based system and the Boswell product in a solvent based system were compared regarding extrusion bond strength, block resistance, printability and tape adhesion. Example 9 is a summary of this work where A is the Boswell, et al. product and B is the product of the instant invention.

The differences between the process of Boswell, et al. as described in the preceding paragraph and the process of the instant invention is further illustrated by summarizing the process steps of each as follows:

The U.S. Pat. No. 5,164,446 to Boswell, et al.

a) tall oil rosin+fumaric acid are first reacted→rosin adduct;

b) rosin adduct+acrylic-styrene copolymer (Joncryl 587);

c) (b)+CaO are reacted;

d) (c)+glycerine.

The process steps of the instant invention are as follows:

a) gum rosin+fumaric acid→rosin adduct;

b) rosin adduct+pentaerythritol;

c) (b)+acrylic-styrene copolymer (Joncryl 679).

Comparing these process steps it is apparent that the synthetic preparation of the Boswell, et al. patent differs appreciably from the synthetic preparation of the instant invention. As further demonstrated herein, the properties of the products of the two processes are uniquely different.

EXAMPLE 9

| (Ink A) Boswell, et al. US 5,164,446 Ingredients | | Parts |
| --- | --- | --- |
| Phthalocyanine Blue | | 17.50 |
| R2450-125 (H. Boswell, et al., EX. #2) | | 28.00 |
| Toluene | | 54.50 |
| | | 100.00 |
| (Ink B) Invention Ingredients | | Parts |
| Hydrobond AX base | | 55.00 |
| X2-4716 (Ex. of our invention) | | 45.00 |
| | | 100.00 |
| Property | (A) Boswell. et al. | (B) Invention |
| Water solubility | no | yes |
| Rheology | Thixotropic Paste | Newtonian Fluid |
| Extrusion Bond Strength g/in. (co-extruded, one side treated, polypropylene film) | 0–10 g/in.. | 70–100 |
| Block Resistance | Pass | Pass |
| Printability | Poor | Excellent |
| Tape Adhesion | Fair | Fair |

Comparison of the properties of inks prepared according to the system of Boswell, et al. with the product of the invention show that the instant invention is a Newtonian Fluid while the Boswell, et al. material is a thixotropic paste. The product of the instant invention has an extrusion bond strength (co-extruded, one side treated, polypropylene film) of 70–100 g/in compared to 0–10 g/in for U.S. Pat. Nos. 5,164,262 and 5,166,446 to Boswell, et al.

It could be asserted that the distinguishing differences between the Boswell, et al U.S. Pat. No. 5,164,446 is due merely to the fact that the Boswell, et al. process uses Joncryl 587, a hydroxy functional acrylic polyol from S. C. Johnson, in the preparation of their modified rosin esters while the instant invention employs Joncryl 679, also from S. C. Johnson, for the preparation of the water soluble modified resin of the invention. Joncryl 679 is an acrylic copolymer with an acid number of 202 and molecular weight of 9,900. Accordingly, a series of cross-over experiments was carried out substituting for Joncryl 587 as taught in that patent, Examples 1 and 2, the Joncryl 679 employed in the instant invention. These experiments and their results are presented in Example 10.

EXAMPLE 10

| (Ink A) Boswell, et al. U. S. Pat. 5,166,446 Ingredients | Parts |
| --- | --- |
| Phthalocyanine Blue | 17.50 |
| R2621-7 (Boswell patent modified resin except using Joncryl 679 for Joncryl 587) | 28.00 |
| Toluene | 54.50 |
| | 100.00 |

| (Ink B) Invention Ingredients | Parts |
| --- | --- |
| Hydrobond AX base | 55.00 |
| X2-4716 (modified rosin ester of invention) | 45.00 |
| using Joncryl 679. | |
| | 100.00 |

Example 10 continued

| Property | Ink (A) | Ink (B) |
| --- | --- | --- |
| Water solubility | no | yes |
| Rheology | Viscous fluid | Newtonian fluid |
| Extrusion Bond Strength (co-extruded, one side treated polypropylene film) | 0 | 70–100 g/in. |
| Block Resistance | Fail | Pass |
| Printability | Poor | Excellent |
| Tape Adhesion | Poor | Fair |

An additional experiment (Example 11) was carried out to prepare the resin precursor of the Boswell et al. U.S. Pat. No. 5,164,446 patent utilizing the Joncryl 587 acrylic styrene polymer.

EXAMPLE 11

The hard resin of Boswell, et al. was prepared according to the process described in Example 1 of the patent (U.S. Pat. No. 5,164,446). The material had an acid value of about 131. It was not soluble in water but was somewhat soluble in toluene.

In summary, the present invention is distinguished over the prior art by the following facts:

the invention is a fortified resin for use in formulating laminating inks, not gravure inks;

the resin of the invention is water soluble, permitting the formulation of water soluble laminating inks;

inks prepared with the resin of the invention are Newtonian fluids, not prior art thixotropic pastes;

bond strength of the invention is very high compared to the prior art and comprise an unexpected result;

printability of inks prepared using the product of the invention is excellent;

where the prior art fails block resistance and tape adhesion tests, the product of the invention passes these critical tests;

the conditions for producing the modified resin of the invention are critical, specific and different than the prior art, i.e., the reaction is carried out for a period of time between fifteen and forty-five minutes at a temperature between 175° C. and 185° C. to produce a modified resin having an acid number between 157 and 175.

What is claimed is:

1. An improved method for preparing a water soluble resin binder wherein the preparation requires reacting a rosin with a dienophile and a polyfunctional hydroxy compound to form an ester and reacting said ester with an acrylic-containing copolymer; wherein said improvement comprises:

using an acrylic-containing copolymer having an acid number greater than 180 wherein the weight ratio of the rosin reaction product to the acrylic copolymer is between 1:2 and 1.5:1; thereby enhancing the water solubility of the resin binder having an acid number of between 157 and 175.

2. The method of claim 1 wherein said rosin is selected from the group consisting of tall oil rosin, wood rosin and gum rosin and said dienophile is selected from the group consisting of fumaric acid, maleic acid, maleic anhydride, acrylic acid and methacrylic acid.

3. The method of claim 1 wherein said acrylic copolymer comprises the copolymer residue of acrylic comonomers selected from the group consisting of acrylic acid, methacrylic acid and vinyl comonomers selected from the group consisting of styrene, alpha methyl styrene, vinyl acetate and vinyl chloride.

4. The method of claim 1 wherein said esterified reaction product is fumarated gum rosin, said polyol is pentaerythritol, said acrylic copolymer is styrenated acrylic acid copolymer whereby said water soluble resin is produced having an acid value between 160 and 173.

* * * * *

UNITED STATES PATENT AND TRADEMARK OFFICE
CERTIFICATE OF CORRECTION

PATENT NO. : 5,814,701

DATED : September 29, 1998

INVENTOR(S) : Robert J. Catena, Mathew C. Mathew, Albert A. Kveglis

It is certified that error appears in the above-identified patent and that said Letters Patent is hereby corrected as shown below:

On the title page, item [76]:

Inventor Albert A. Kveglis to read:  6 Buckingham Circle

Signed and Sealed this

Eleventh Day of May, 1999

Attest:

Q. TODD DICKINSON

*Attesting Officer*        *Acting Commissioner of Patents and Trademarks*

UNITED STATES PATENT AND TRADEMARK OFFICE
CERTIFICATE OF CORRECTION

PATENT NO. : 5,814,701

DATED : September 29, 1998

INVENTOR(S) : Robert J. Catena, Mathew C. Mathew, Albert A. Kveglis

It is certified that error appears in the above-identified patent and that said Letters Patent is hereby corrected as shown below:

<u>On the Cover page</u>

Add: [73] Assignee: Sun Chemical Corporation
Fort Lee, New Jersey 07024

Add: *Attorney, Agent or Firm -* Sidney Persley

Signed and Sealed this

Twentieth Day of July, 1999

Attest:

Q. TODD DICKINSON

*Attesting Officer*  *Acting Commissioner of Patents and Trademarks*